Oct. 20, 1936.  J. B. STRAUSS  2,057,930
VEHICLE STEERING MECHANISM
Filed Oct. 28, 1935  2 Sheets-Sheet 1
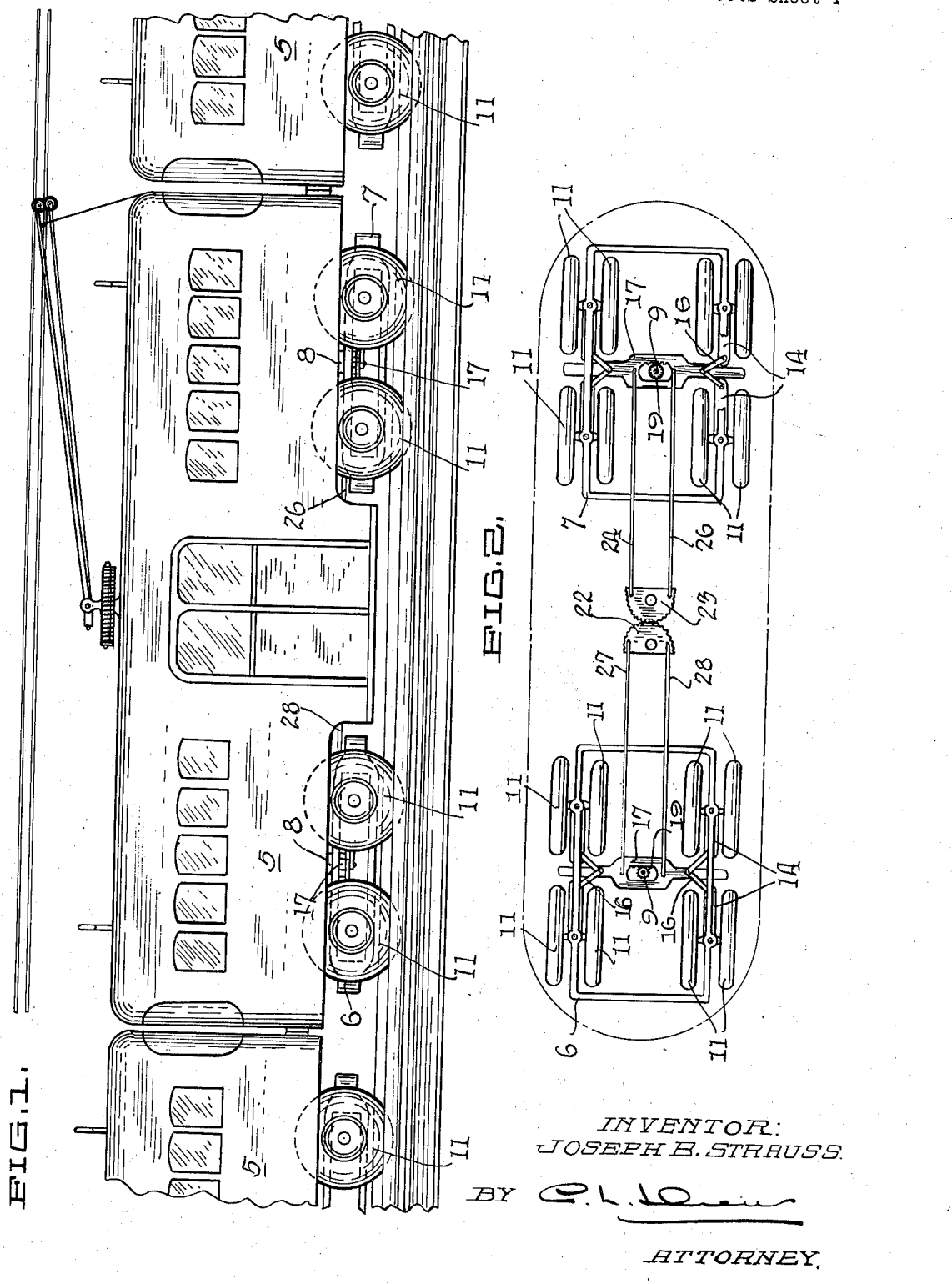
INVENTOR:
JOSEPH B. STRAUSS.
BY
ATTORNEY.

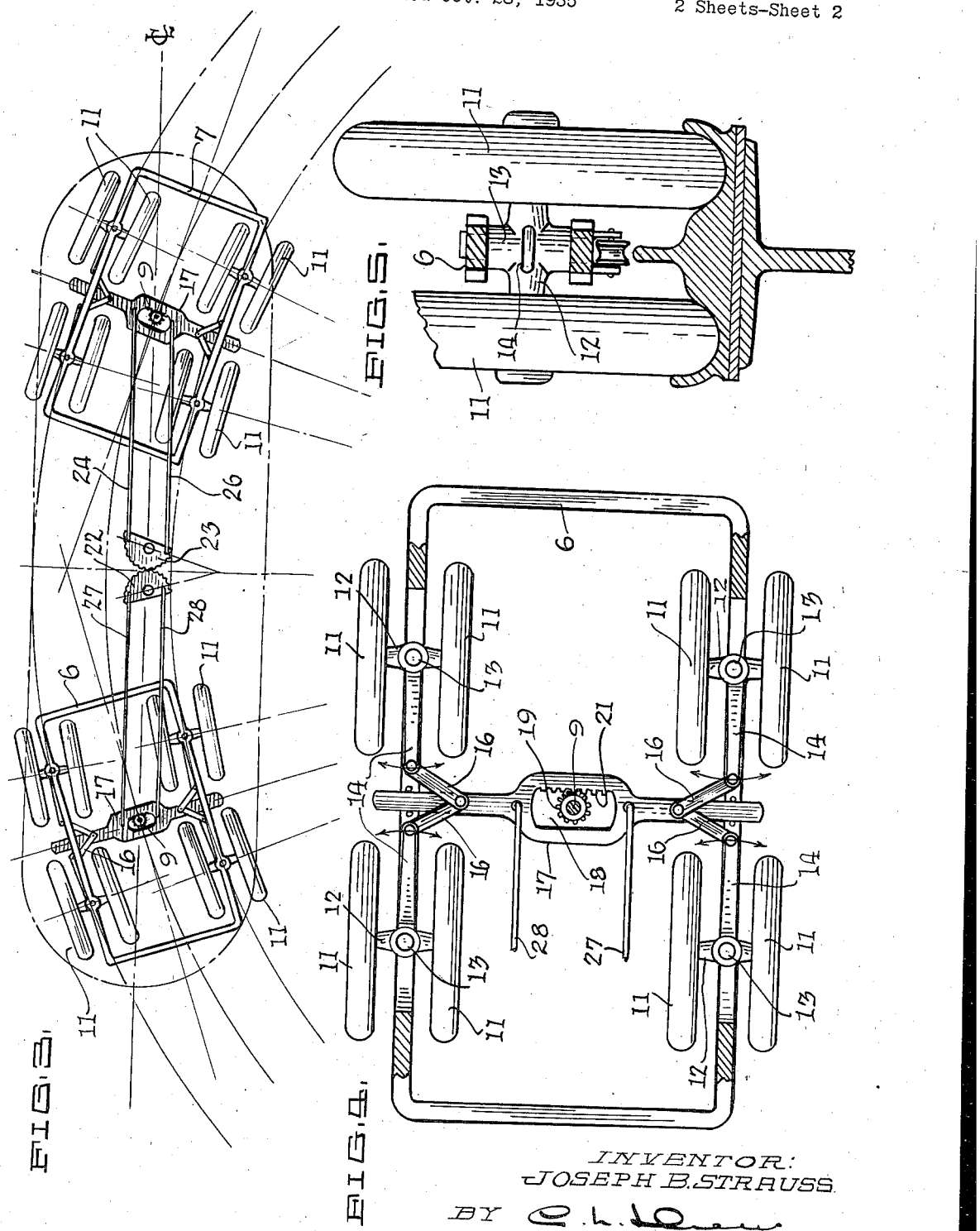

Patented Oct. 20, 1936

2,057,930

UNITED STATES PATENT OFFICE 2,057,930

VEHICLE STEERING MECHANISM

Joseph B. Strauss, San Francisco, Calif.

Application October 28, 1935, Serial No. 47,102

5 Claims. (Cl. 280—99)

This invention relates to improvements in vehicles and steering mechanism therefor.

The principal object of this invention is to provide means for steering a vehicle either upon a track or upon the highway in such a manner that all of the wheels will track, thereby permitting an eight-wheeled vehicle to negotiate curves without undue efforts or skidding of any of the tires.

A further object is to produce a device of this character which will permit the coupling of the vehicles into trains without interfering with the steering.

A further object is to produce a device which may be applied to the ordinary trolley car without materially altering its construction.

Other objects and advantages will be apparent during the course of the following description.

In the accompanying drawings forming a part of this specification and in which like numerals are employed to designate like parts throughout the same, Fig. 1 is a side elevation of a car in a train and having my invention applied thereto;

Fig. 2 is a diagrammatic view showing the arrangement of the trucks of the car and the steering mechanisms therefor;

Fig. 3 is a similar view to Fig. 2 illustrating the manner in which the trucks and wheels pivot in negotiating a curve;

Fig. 4 is an enlarged detail view of one of the trucks; and

Fig. 5 is a fragmentary view showing the manner in which the wheels would engage a cupped rail.

Present-day transportation has reached the point where light cars are employed capable of travelling long distances at high speed and employing a minimum amount of power; therefore, it is possible to not only run these cars over rails but to also run them on the highways without injury to the highways. It is therefore applicant's intention to provide a steering mechanism which will permit a vehicle, such as a trolley car, having trucks and a plurality of wheels upon each truck to be steered in such a manner that each wheel is pivoted to better facilitate curves or other maneuvers.

In the accompanying drawings wherein for the purpose of illustration is shown a preferred embodiment of my invention, the numeral 5 designates a car body which may be of any desired size or shape beneath which car body and at the opposite ends thereof are placed trucks 6 and 7.

As both of these trucks are identical but one will be described. These trucks are pivoted to the car through the medium of the customary bolsters 8 and king pin 9. In the present instance I have shown four sets of dual wheels 11, each set being mounted upon an axle 12 carried upon a steering knuckle 13 (see Figs. 4 and 5) and each steering knuckle is provided with a steering arm 14. The steering arms on the opposite sides of the trucks project toward each other and are connected by links 16 to a cross bar 17, which cross bar has an opening 18 surrounding a gear 19 concentric with the king pin 9. This gear meshes with teeth 21 formed upon the cross bar 17. It will be obvious from the description thus far that movement of the cross bar longitudinally of the truck will push upon the links 16 upon one side of the truck and pull upon the links 6 upon the opposite side of the truck and depending upon the direct movement of the cross bar, movement of the steering arms 14 will cause the wheels 11 to pivot about the steering knuckles 13.

By now referring to Fig. 2 it will be noted that segments 22 and 23 are pivoted beneath the car and are in toothed engagement, one with the other. Pull rods 24 and 26 connect to the segment 23 on opposite sides of its pivot and extend rearwardly and connect to the cross bar 17 of the truck 7 upon opposite sides of the king pin 9. Similar pull rods 27 and 28 connect the segment 22 to the cross bar 17 of the truck 6.

In order to steer the vehicle upon a highway it is necessary to manually rotate one of the gears 19. This may be accomplished in any desired manner, while the gear 19 at the opposite end of the vehicle must be hooked to the car body.

The result of this construction is that when a vehicle constructed in accordance with my invention is driven over the highway the manual operation of the steering mechanism will rotate the forward gear 19 (the rear gear 19 being locked) which will cause the cross piece 17 to move the links 16 and transmit pivotal action to the wheels of the front truck, as for instance the truck 6. The truck will, therefore, tend to rotate about its king pin and in so rotating the rods 27 and 28 will rotate the segment 22 and through the tooth connection the segment 23 will be rotated and through the rods 24 and 26 the rear truck will be rotated to the same degree that the front truck is rotated. As soon as the rear truck rotates the cross bar 9 will be moved laterally with respect to the truck due to the fact that the rear gear 19 is locked and consequently this lateral movement will cause a pivotal action of the wheels 11 of the rear truck, thus causing all wheels of the vehicle to track, as illustrated in Fig. 3. When the vehicle approaches a rail structure the same is driven on to the rails which may be of cupped formation as illustrated in Fig. 5 and after the vehicle has been driven on to the tracks manual steering thereof may cease as the tracks will guide the wheels in a most obvious manner.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a car body, a pair of trucks pivotally connected to the opposite ends of said car body through the medium of king pins, independently pivoted wheels supporting each of said trucks, each of said wheels having a steering arm associated therewith, a cross bar carried by each of said trucks, linkage connected to each end of said cross bars and to the adjacent steering arms, said adjacent steering arms extending toward each other.

2. In a device of the character described, a car body, a pair of trucks pivotally connected to the opposite ends of said car body through the medium of king pins, independently pivoted dual wheels supporting each of said trucks, each of said dual wheels having a steering arm associated therewith, a cross bar carried by each of said trucks, linkage connected to each end of said cross bars and to the adjacent steering arms, and means for moving said cross bars laterally with respect to said truck.

3. In a device of the character described, a car body, a pair of trucks pivotally connected to the opposite ends of said car body through the medium of king pins, independently pivoted wheels supporting each of said trucks, each of said wheels having a steering arm associated therewith, a cross bar carried by each of said trucks, linkage connected to each end of said cross bars and to the adjacent steering arms, and means for moving said cross bars laterally with respect to said truck, said means including a gear engaging teeth formed on said cross bar.

4. In a device of the character described, a car body, a pair of trucks pivotally connected to the opposite ends of said car body through the medium of king pins, independently pivoted dual wheels supporting each of said trucks, each of said dual wheels having a steering arm associated therewith, a cross bar carried by each of said trucks, linkage connected to each end of said cross bars and to the adjacent steering arms, and means for moving said cross bars laterally with respect to said truck, said means including a gear engaging teeth formed on said cross bar, and means for pivoting said trucks simultaneously with respect to the car body.

5. In a device of the character described, a car body, a pair of trucks pivotally connected beneath said car body and adjacent the opposite ends thereof through the medium of king pins, spaced independently pivoted axles secured to each of said trucks, a wheel mounted on the opposite ends of each of said axles, a steering arm connected to each of said axles, the steering arms on the opposite sides of said truck approaching each other, a cross bar slidably mounted beneath said truck, links pivoted to said cross bar and to said steering arms, and means for moving said cross bars on each of said trucks simultaneously to effect a steering of all of said wheels.

JOSEPH B. STRAUSS.